March 26, 1940.  E. R. NEUMANN ET AL  2,195,338
CULTIVATOR FENDER ADJUSTER
Filed Sept. 15, 1938  2 Sheets-Sheet 1
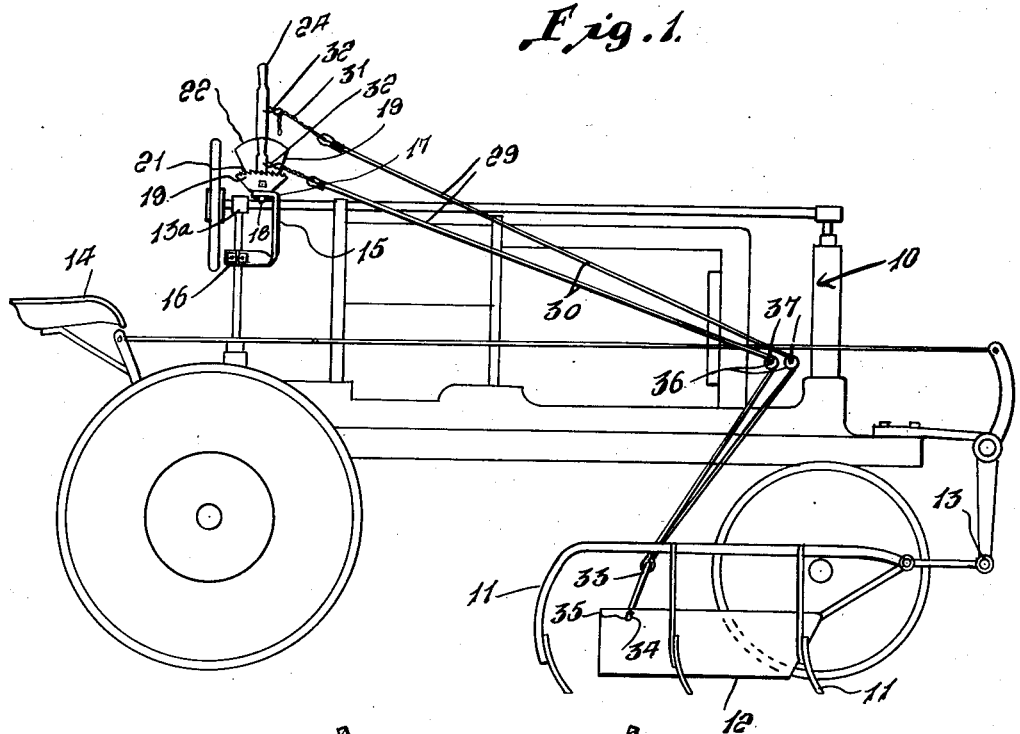
Fig. 1.
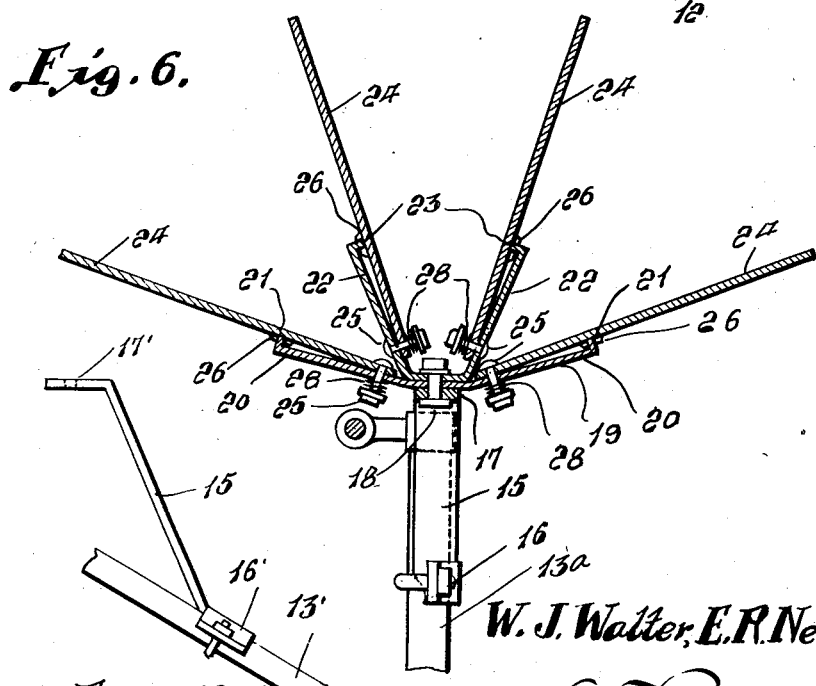
Fig. 6.
Fig. 7.
Inventors
W. J. Walter, E. R. Neumann
By L. F. Randreph
Attorney March 26, 1940.  E. R. NEUMANN ET AL  2,195,338
CULTIVATOR FENDER ADJUSTER
Filed Sept. 15, 1938  2 Sheets—Sheet 2
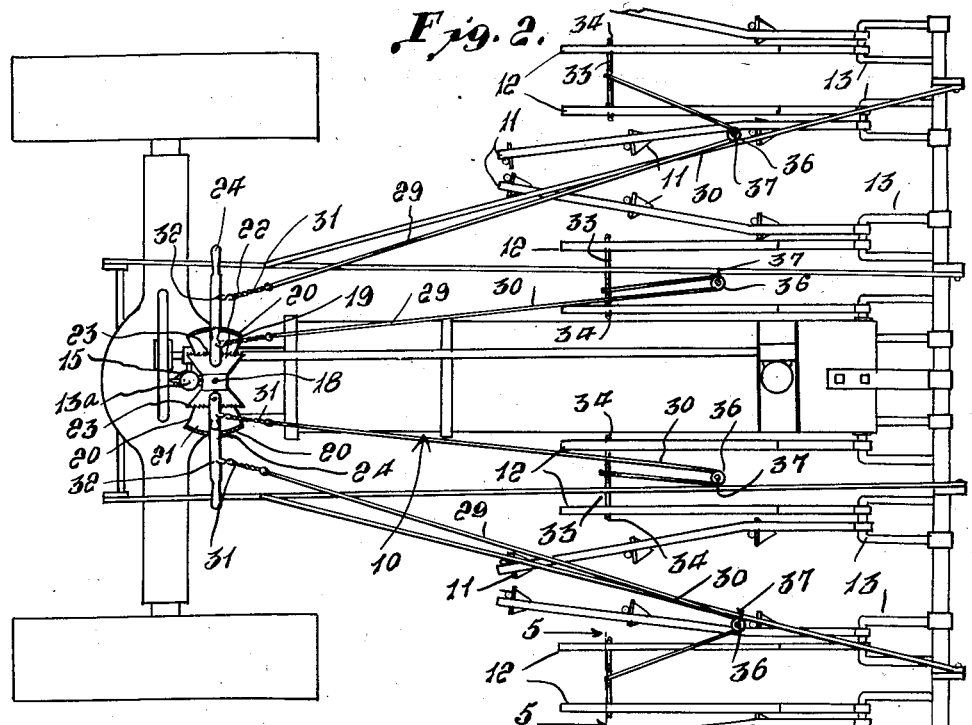
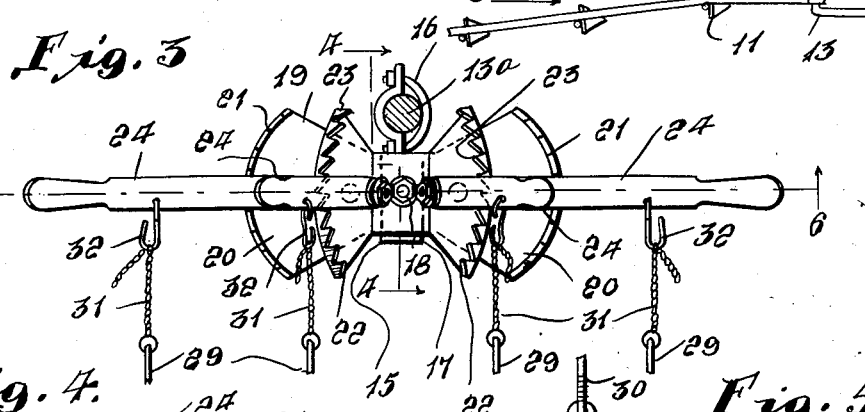
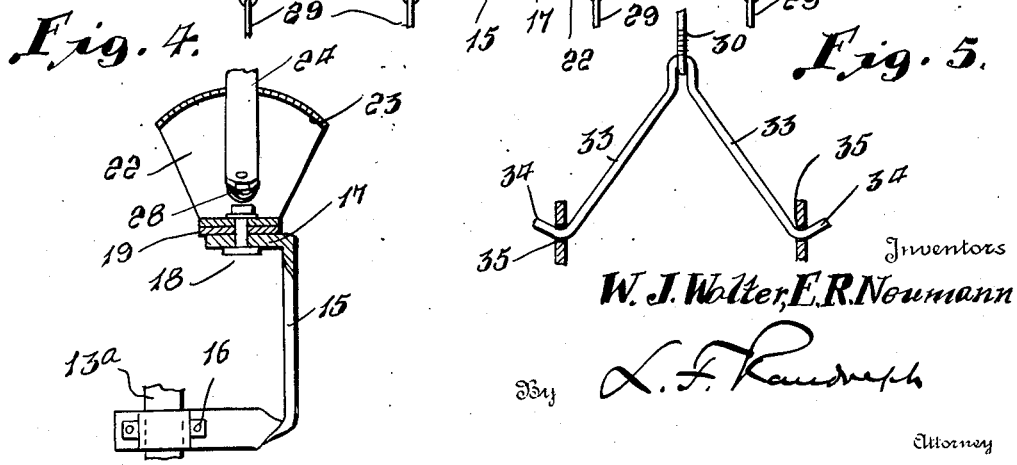
Inventors
W. J. Wolter, E. R. Neumann
By L. F. Randolph
Attorney Patented Mar. 26, 1940

2,195,338

UNITED STATES PATENT OFFICE 2,195,338

CULTIVATOR FENDER ADJUSTER

Erwin R. Neumann and Willie J. Walter,
Perry, Tex.

Application September 15, 1938, Serial No. 230,140

2 Claims. (Cl. 74—533)

This invention relates to a cultivator fender adjuster.

In connection with the fenders used on cultivators especially when cultivating young row crops it is necessary to regulate the amount of dirt which is put to the drill of the row crops, constantly in order to meet the changes of soil and slope conditions while the tractor is in motion. With existing tractors, it is impossible to so adjust the fenders while the tractor is in motion and it is an object of the present invention to provide a construction which will perform the function mentioned in an efficient and reliable manner.

It is also an object to provide a construction which may be readily attached to existing tractor cultivators, as well as built into tractor cultivators at the factory, and one which may be used in connection with two row tractor cultivators, four row tractor cultivators or ones for additional rows.

The more specific objects and advantages will become apparent from a consideration of the description following taken in connection with accompanying drawings illustrating an operative embodiment.

In said drawings:—

Figure 1 is a view in side elevation, showing our improvements applied to a tractor cultivator;

Figure 2 is a plan view of the parts of Figure 1;

Figure 3 is an enlarged top or plan view of the operating parts of the attachment or improvements;

Figure 4 is a vertical sectional view taken on the plane of line 4—4 of Figure 3;

Figure 5 is a detail view taken on the plane of line 5—5 of Figure 2;

Figure 6 is a vertical sectional view taken on the plane of line 6—6 of Figure 3, and Figure 7 is a detail elevation of a slightly modified form of attaching bracket for the mounting or operating means.

Referring specifically to the drawings wherein like reference characters designate like or similar parts, 10 designates a conventional tractor equipped with cultivator means as at 11 with which, fenders 12 are associated in pairs, such fenders being pivoted for vertical movement on a horizontal axis as at 13. All of the parts mentioned are conventional and it will be realized that the fenders are used on cultivators especially when cultivating young row crops for the purpose of regulating the amount of dirt which is put to the drill of the row crops. The invention is shown in connection with a four row tractor cultivator but it is clear that it may be practiced in connection with a two row tractor cultivator or on the contrary, may be practiced in connection with cultivators having any desired number of rows, the illustration being by way of example only.

The present type of tractor illustrated has a vertical steering post at 13a and all parts are under control of an operator and accessible to him while seated at 14. Rigidly secured to the post 13a is a generally U-shaped bracket 15 having removable clamp means 16 directly secured to such post. Said bracket also has a horizontal portion or plate 17. Bolted rigidly to such plate 17 or otherwise rigidly fastened, either permanently or removably as at 18 is a locking plate 19 preferably having segments 20 at the ends, inclining upwardly and marginally provided with ratchet teeth as at 21. In the case of a two row cultivator, this single plate 19 suffices. However since a four row cultivator is illustrated, another locking or securing plate 22 is provided, which is identical with the plate 19 except that end segments 23 are disposed at a more obtuse angle to separate them from the segments 20, thus providing all of the segments for operation or control from the same zone, and operation and control of the moving parts without interference with each other. It will be noted that the fastening means 18 also secures the plate 22 rigidly in place.

Each plate or segment 20 and 23 has a lever 24 pivoted thereto as by means of a bolt or stud 25. Each lever has a lug or pawl 26 adapted to engage the co-acting adjacent ratchet teeth of the segments 20 and 23. In order to permit the levers 24 to yield in sliding over the ratchet teeth 21 and 27, such levers have play longitudinally of the bolts 25, are somewhat loosely mounted thereon, and are engaged by expansive coil springs 28 surrounding the bolts, engaging the heads thereof and engaging the levers to urge the lugs into contact with the ratchet teeth.

Flexible elements generally designated 29 extend one from each lever 24. Such elements may consist, for example, of ropes or cords 30 having metallic link chains 31 at their upper ends, which are engageable with hooks 32 carried by the levers 24. The links of the chain enable attachment of any of them and thus adjustable attachment of the flexible elements to the hooks and levers. At the other ends, said flexible elements 29 are attached in any suitable manner to the fenders 12, depending upon the particular make of tractor cultivator. As shown, the cords 30 are attached to yokes 33 preferably comprising V-shaped pieces of metallic wire having terminals 34 extending through openings 35 in the fenders, such yokes having a tendency to separate at their free ends to maintain the connection shown best in Figure 5.

In order to render operation of the flexible elements easier, each one is trained over one or more pulleys 36, which are disposed and fastened at any desired location. The pulleys are carried for instance by flexible wires 37 attachable to adjacent parts of the tractor and preferably to the bars 38 of the cultivator which raise and lower the plows of the cultivator so that when the plows are lifted out of the ground to turn the tractor at the ends of rows, the fenders are automatically lifted also.

It will be clear that the operator at the seat 14 may while the tractor cultivator is in motion, or otherwise, operate any of the levers 24 in order to draw on or pay out on the flexible elements 29 to thereby raise or lower the fenders as desired, such levers being capable of rocking slightly at a right angle to the segments in order to disengage the pawls from the ratchet teeth thereon, following which, the springs 19 will automatically lock the levers in any position in which they are left, after effecting the desired adjustment.

Various changes may be resorted to within the spirit and scope of the invention. For instance, in lieu of the specific bracket 15, we may employ that shown at 15', in cases where the steering post 13' is oblique. Such bracket 15' has clamping means 16' associated therewith to engage the post 13' and also has a plate or the like 17' to function exactly like that at 17.

We claim as our invention:

1. Apparatus of the class described comprising a plate, a U-shaped plate having its bight disposed against a face of the first plate intermediate the ends of the first plate whereby the end portions of the plate will be in spaced angular relation, fastening means for the plate passing therethrough at said bight, control levers one for each plate portion extending outwardly beyond the respective plate portions, means pivoting said levers to the plate for movement thereover and movement toward and away from the same, said plate portions at their outer ends having flanges, and said flanges having teeth with which the adjacent levers co-act.

2. Apparatus of the class described comprising a plate, a U-shaped plate having its bight disposed against a face of the first plate intermediate the ends of the first plate whereby the end portions of the plate will be in spaced angular relation, fastening means for the plate passing therethrough at said bight, control levers one for each plate portion extending outwardly beyond the respective plate portions, means pivoting said levers to the plate for movement thereover and movement toward and away from the same, said plate portions at their outer ends having flanges, said flanges having teeth with which the adjacent levers co-act, said levers being angularly disposed with respect to their engaged plate portions, and the pivot means for said levers comprising bolts, and spring means carried by the bolts urging the levers into contact with their respective plate portions.

ERWIN R. NEUMANN.
WILLIE J. WALTER.